US006179369B1

United States Patent
Bender et al.

(10) Patent No.: US 6,179,369 B1
(45) Date of Patent: *Jan. 30, 2001

(54) DEVICE FOR PREVENTING INFILTRATION OF FLUIDS AND PARTICULATES WITHIN THE INTERIOR OF A TRAILER

(75) Inventors: Mitchell I. Bender, Northfield, IL (US); Terry L. Ware, Constantine, MI (US)

(73) Assignee: Pace American, Inc., Middlebury, IN (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/084,123

(22) Filed: May 22, 1998

(51) Int. Cl.[7] .................................................. B62D 33/04
(52) U.S. Cl. .............................................. 296/181; 296/29
(58) Field of Search .................................... 296/181, 182, 296/187, 29

(56) References Cited

U.S. PATENT DOCUMENTS

| | | | |
|---|---|---|---|
| 4,592,585 | * 6/1986 | Oren et al. | 296/181 |
| 4,685,721 | * 8/1987 | Banerjea | 296/181 |
| 5,143,416 | * 9/1992 | Karapetian | 296/29 |
| 5,741,042 | * 4/1998 | Livingston et al. | 296/187 |
| 5,769,478 | * 6/1998 | Vernese | 296/181 X |
| 5,934,741 | * 8/1999 | Beukers et al. | 296/181 |

OTHER PUBLICATIONS

Advertisement depicting Pace American trailer construction (No Date).

* cited by examiner

Primary Examiner—D. Glenn Dayoan
Assistant Examiner—Jason Morrow
(74) Attorney, Agent, or Firm—Van Dyke, Gardner, Linn & Burkhart, LLP

(57) ABSTRACT

A sealing device for an enclosed cargo trailer comprises four integrally attached members positioned between the vertical posts and the cross supports of a cargo trailer structural assembly. The placement of the sealing device prevents particulates and fluids from being drawn up between the vertical post and the cross support and subsequently entering the interior of the trailer through the slit between the sidewalls and the flooring. In another aspect of the invention a reversible cross support is disclosed comprising three integrally formed members. A first channel is formed on one side of the first member and located proximate to its bottom, while the opposing side is also formed with a channel proximate to the top of the first member. The placement of these channels permits the cross support to be attached to and extend toward either side of the cargo trailer, thereby eliminating the costs associated with providing cross supports which can extend in only one direction.

8 Claims, 3 Drawing Sheets

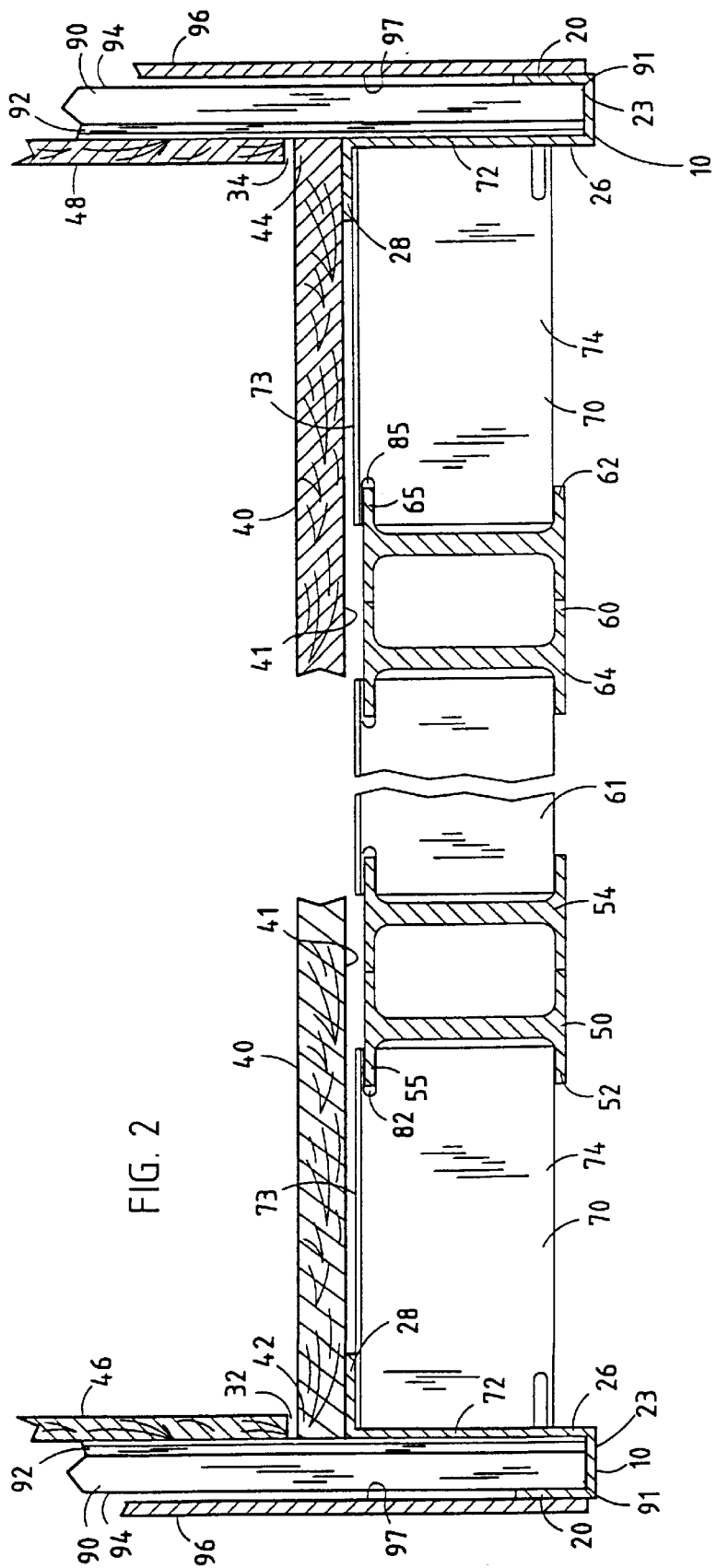

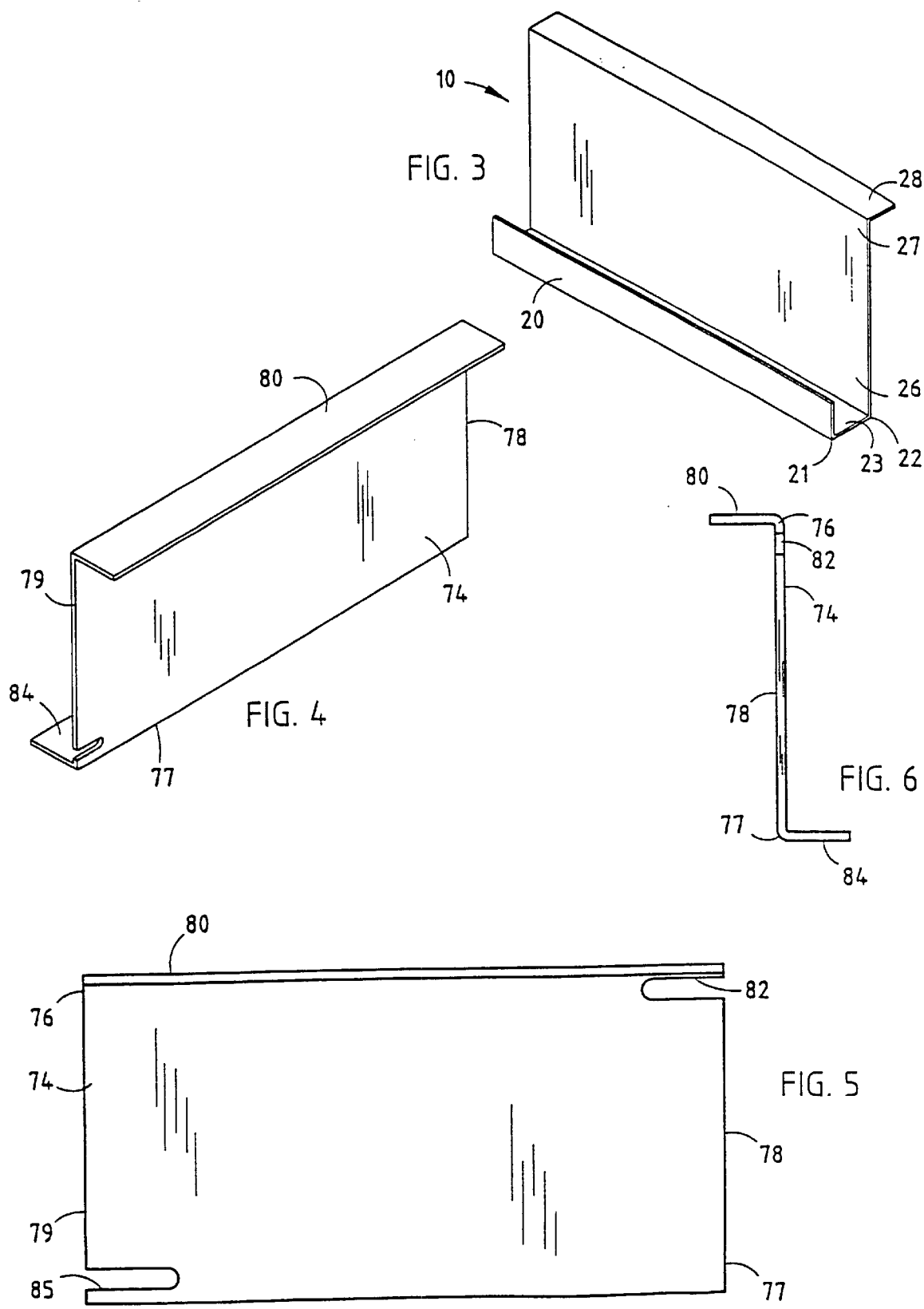

DEVICE FOR PREVENTING INFILTRATION OF FLUIDS AND PARTICULATES WITHIN THE INTERIOR OF A TRAILER

BACKGROUND AND TECHNICAL FIELD OF THE INVENTION

The present invention relates generally to enclosed cargo trailers and, more particularly, to a device which prohibits fluids and particulates from entering the interior of an enclosed cargo trailer.

Presently, enclosed cargo trailers find a wide variety of application in both the industrial and consumer markets. These trailers are frequently employed to store and transport a variety of boxed and loose cargo, furniture, vehicles and the like. Some of the vehicles transported by enclosed cargo trailers include automobiles, snowmobiles, motorcycles, and go-carts. Delicate objects or objects and packaging which are susceptible to weather or road debris damage are frequently hauled in enclosed cargo trailers. More often than not, the cargo being hauled by these trailers is of sufficient commercial value or personal worth to the trailer operator to justify the cost of an enclosed trailer as opposed to open flat-bed trailers which provide little protection from road debris and weather damage.

Standard cargo trailers normally comprise an enclosed interior into which the cargo is placed. A structural assembly incorporated with or connected to the trailer chassis is generally disposed below the floor of the interior and provides a frame for the trailer. Such a structural assembly contains at least two sets of longitudinal I-beams, placed a preselected distance apart, running from the front to the rear of the trailer. The I-beams normally comprise part of or are secured to the trailer chassis. Additional support is gained by a series of cross members forming floor joists which are attached perpendicularly and span between the I-beams. Attached along the opposing sides of the I-beams are additional outwardly extending cross supports which cooperate with the spanning cross members in forming floor joists. The outward cross supports extend towards, and the distal ends are and secured to, thin vertically aligned posts positioned along the sides of the trailers. The vertical posts form wall studs which support the enclosing exterior walls of the trailer. Conventionally, the cross supports are generally "C" shaped in cross-section. The cross supports are thus directionally "handed" and can only be used in a given orientation with the lateral opening to the "C" facing rearwardly. If the cross support lateral opening were faced forwardly, unwanted road debris would undesirably collect on the lower ledge of the cross member.

An attachment assembly in conventional operational connection with the structural components of the trailer, typically the longitudinal I-beams or other chassis components, permits the trailer to be coupled to a vehicle for transportation. The structural configuration of the adjustment assembly varies in accordance with both the configuration of the trailer and the vehicle used for transportation.

The interior of a cargo trailer normally has a plywood flooring placed over the structural assembly. The vertically aligned posts depend below the plywood flooring to be approximately co-planar with the bottom of the I-beams. Conventionally, along the sides of the trailer are interior sidewalls which are secured to the vertically aligned posts or studs and rest on the flooring. As previously noted, exterior paneling is provided in the form of thin sheeting, and is attached to the exterior surface of the posts or studs.

One problem common to all enclosed trailers is the unwanted introduction of particulate matter, such as dust, sand, small gravel, grease, and other like road debris, and fluids, such as a rainwater and snow melt, to the trailer's interior. During transportation, it is the inventors' understanding that movement of the trailer causes a draft, or pressure gradient, between the paneling and the sidewalls. This draft, in turn creates a partial vacuum which draws particulate matter and fluids between the interior surface of the posts and the thin slit or crack defined by the intersection of the sidewalls and the flooring. Since the sidewalls are connected to the vertical posts or studs, there is no positive connection between the sections of sidewall spanning the vertical posts and the trailer flooring assembly. A slight longitudinal crack is thus formed at each span between vertical posts and the abutment with the floor assembly. The fluids and particulates are eventually drawn into the interior of the trailer through these cracks. Once within the interior, the fluids and particulates cause serious damage to the cargo being transported. Any bowing of the trailer sidewalls between vertical posts due to wind generated while towing increases the crack width and exacerbates the problem. Moreover, both the sidewalls and the flooring are normally made of treated plywood, and thus when repeatedly exposed to moisture, tend to deform, crack, or otherwise fail, resulting in the need for maintenance or replacement.

In response to this issue, the industry has employed a variety of sealing compounds which are inserted between the sidewalls and the flooring in order to form a sealing joint at the corner abutment. These sealing compounds provide only a temporary solution to the intrusion of particulate matter and fluids. Over time, exposure to the elements causes the chemical degradation of these sealing compounds. Once degradation begins, the sealing material no longer performs its function of prohibiting fluids and particulate material from entering the interior of the trailer.

Consequently, there exists a need for a device which can effectively prohibit the infiltration of fluids and particulates into the trailer interior, is simple and cost effective to manufacture, and provides additional structural support for the trailer.

SUMMARY OF THE INVENTION

Accordingly, the present invention, advances a new and unique device and assembly which prohibits the infiltration of moisture, particulates, and other fluids into the interior of a trailer via the crack or slit defined by the intersection of the floor and sidewalls. According to one preferred aspect of the invention, the device includes an angled member positioned in the area defined between the vertical posts and the cross supports of a trailer. The positioning of the member creates a seal, preventing particulates and fluids from being drawn between the posts and the cross support and subsequently entering the interior of the vehicle. Moreover, the angled member provides additional structural support between the cross supports and the vertical posts.

According to another preferred aspect of the invention, the device includes a rail or member having four attached sections that provide an overall "S" or somewhat "Z" configuration. The first section is positioned between the exterior surface of the vertical posts and the interior surface of the panels and is orthogonally attached to a second section positioned beneath the bottom surface of the vertical posts. A third section, orthogonally joined to the second section, is positioned between the interior surface of the vertical post and the cross support member and is orthogonally attached to a fourth section positioned between the top of the cross support members and the bottom of the flooring. In a preferred embodiment, the sections are integrally formed.

According to another aspect of the invention, a reversible cross support member or joist for a trailer is also provided with a generally "Z" shaped cross section. The cross member includes a first member having a top and opposing bottom. Extending from the top of the first member is a second member, while the bottom has extending therefrom a third member. The second and third member extend from the first member in opposite directions, and in a preferred embodiment, both the second and third members extend perpendicularly from the first member. The first member is formed with a pair of channels. The first of these channels is formed in one side of the first member and proximate to the second member. The other channel is formed in the opposing end of the first member and is proximate to the third member. Preferably, these channels are horizontal.

The support member is reversible, that is, it can be attached to either the right-hand side or the left-hand side of the I-beam. This reversibility eliminates the need to produce separate support members for support between the left-hand side of the trailer and the I-beam and the right-hand side of the trailer and the I-beam. This in turn reduces production and warehousing costs.

These and other advantages, benefits and objects will be understood by one skilled in the art from the drawings, description, and claims which follow.

DESCRIPTION OF THE DRAWINGS

FIG. 2 is a cross-sectional, partially fragmentary end view of the cargo section of an enclosed cargo trailer according to the present invention, taken along line I—I of FIG. 1;

FIG. 3 is a perspective view of the sealing device according to the present invention;

FIG. 4 is a perspective view of a crossing support member according to the present invention;

FIG. 5 is a front view of a crossing support member according to the present invention shown in FIG. 4; and FIG. 6 is a side view of a crossing support member according to the present invention shown in FIG. 4.

DESCRIPTION OF THE PREFERRED EMBODIMENTS

Figure 1:
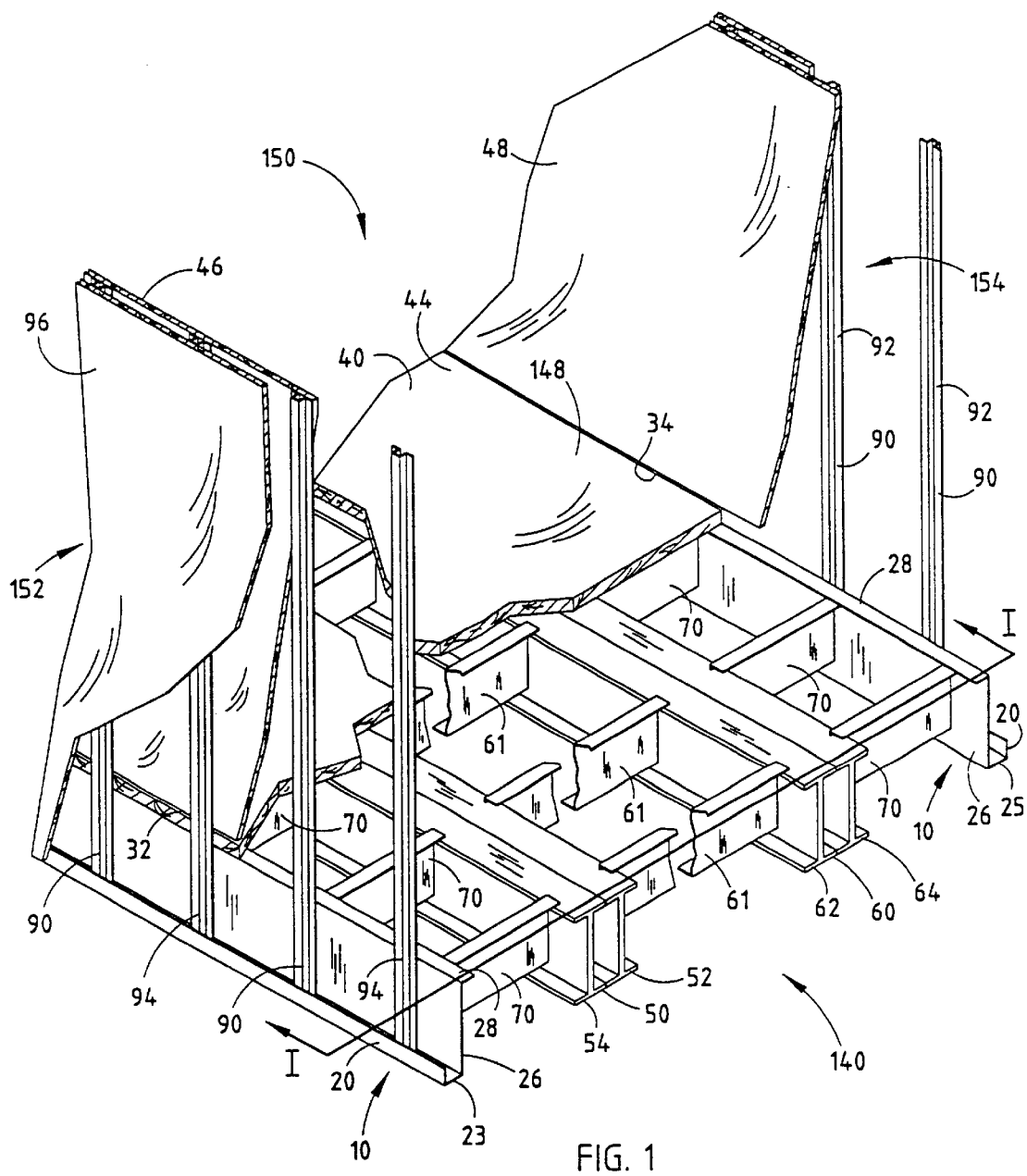
FIG. 1 is a perspective, partial cut-away view of the cargo section of an enclosed cargo trailer according to the present invention.

The present invention is embodied in a unique sealing device for prohibiting liquids and particulate matter from infiltrating the interior of an enclosed cargo trailer. Turning now to FIGS. 1 and 2, there is shown a sealing device according to a preferred embodiment of the present invention, and generally designated by reference number 10, shown positioned within the structural framework of an enclosed cargo trailer 150.

Normally, the support or structural assembly 140 of cargo trailer 150 contains a first set of I-beams 50 having two contiguous I-beams 52 and 54. A second set of I-beams 60, having contiguous I-beams 62 and 64, are positioned in spaced relation to first set of I-beams 50. Both first I-beam set 50 and second I-beam set 60 are oriented horizontally and run longitudinally from the front of trailer 150 to the rear. Attached perpendicularly to I-beam 52 of the first set 50 and I-beam 62 of the second set 60 are a series of spanning cross members 61. Additionally, a plurality of side cross supports 70 are attached to I-beams 54 and 64, and extend in cantilever fashion toward sides 152 and 154, respectively, of trailer 150.

Upon I-beams 52, 54, 62, and 64, spanning cross members 61 and side support members 70 is laid a floor 40. Floor 40 is attached to the structural assembly 140 by any means conventional to the industry. Floor 40 can be made of any material commonly employed in the art having the requisite rigidity necessary to support the cargo of interest. Most often, floor 40 is made of treated plywood.

Positioned along sides 42 and 44 of floor 40 are a pair of inner sidewalls 46 and 48. Floor 40 and sidewalls 46 and 48 together with a roof (not shown) define a trailer interior 148. Sidewalls 46 and 48 are attached to the interior surfaces 92 of vertical posts 90. Vertical posts 90 therefore operate as studs for the trailer enclosure. Vertical posts 90 are positioned along sides 152 and 154 of trailer 150 and are attached to sealing device 10 in a manner which will be discussed in detail below.

On the opposing, or exterior side 94 of vertical posts 90 are placed a plurality of exterior panels 96. Panels 96 are attached to posts 90 by any means commonly employed in the art including, but not limited to, screw type fasteners or rivets. At the intersection of floor 40 and sidewalls 46 and 48, cracks or slits 32 and 34, respectively, are formed. Heretofore, the presence of slits 32 and 34 has provided an entrance for the introduction of particulates and fluids into interior 148 of trailer 150. As used herein, the term "particulates" means any solid substance commonly encountered on a road, track, or other driving surface. The term "particulates" includes, but is not limited to dust, dirt, gravel, stones, and glass. As used herein the term "fluids" includes any liquid or gas normally encountered in driving conditions as well as rainwater, snowmelt and the like. The term "liquids" includes, but is not limited to grease, oil, gasoline, diesel, water, moisture and mixtures thereof.

Turning now to FIG. 3, there is shown a perspective view of sealing device 10. Sealing device 10 includes an outer first member 20 attached to side 21 of a lower second member 23. Extending from inner side 22 of second member 23 is a generally vertical third member 26. An upper fourth member 28 extends from the inner side 27 of third member 26. In a preferred embodiment, members 20, 23, 26, and 28 are integrally formed. Additionally, in a preferred embodiment, each member extends orthogonally, or at a right angle from each adjacent member. Thus, in the preferred embodiment, members 20 and 26 would be parallel, as would members 23 and 28. In a preferred embodiment, sealing device 10 has a somewhat "Z" or "S" shaped cross section, with an upstanding outer lip on the lower wall of the "Z." Sealing device 10 can be manufactured from any material normally used in the art having sufficient durability and rigidity. Such materials include, but are not limited to polymers, metals and metal alloys.

Sealing device 10 is positioned within structural assembly 140 of trailer 150 such that first member 20 is vertically oriented between exterior surfaces 94 of posts 90 and interior surfaces 97 of panels 96. Accordingly, lower second member 23 will be positioned beneath bottoms 91 of vertical posts 90, while third member 26 will be vertically oriented between ends 72 of outer cross supports 70 and interior surfaces 92 of vertical posts 90. Upper fourth member 28 will be positioned between bottom surface 41 of floor 40 and tops 73 of cross supports 70. Sealing device 10 therefore preferably forms a rail that wraps beneath vertical posts 90 and bends over outer cross supports 70, with exterior panels 96 abutting outside of sealing device 10 and flooring resting on top of sealing device 10.

As shown in FIG. 1, sealing device 10 runs from the rear of the trailer to its front. Securement between sealing device 10, vertical posts 90 and cross supports 70 is achieved by attaching lower second member 23 to bottoms 91 of vertical posts 90 and upper fourth member 28 to tops 73 of cross supports 70. Attachment of lower second member 23 to vertical posts 90 and upper fourth member 28 to cross supports 70 can be achieved by any attachment means commonly employed in the art. Preferably, second member 23 is welded to bottoms 91 of vertical posts 90 and fourth member 28 is welded to tops 73 of cross supports 70.

When positioned in structural assembly 140 of trailer 150, device 10 provides a barrier between interior surfaces 92 of vertical posts 90 and the ends 74 of cross supports 70. In doing so, sealing device 10 prohibits the infiltration of moisture, particulates, and other fluids into the interior 148 of trailer 150 through slits 32 and 34, which would otherwise occur when trailer 150 is in motion. Thus, sealing device 10 serves to protect the cargo positioned within trailer 150 as well as prolong the life of floor 40 and sidewalls 46 and 48. Furthermore, device 10 increases the structural integrity of trailer 150 by providing additional support between cross supports 70 and vertical posts 90. It is the inventor's belief that sealing device 10 operates similarly to a labyrinth seal in order to define a convoluted passage which impedes particulate and liquid travel. Alternatively, sealing device 10 may be positioned with upper fourth member 28 seated on top of floor 40, although it is believed that this arrangement would not be as effective in impeding passage of fluid and debris into the interior of the trailer. As another alternative, first member 20 may be positioned exterior of panels 96 so that lower second member 23 wraps beneath panels 96. Again, it is believed that this alternative arrangement may not be as effective as the most preferred arrangement.

In the most preferred embodiment, first member 20 is approximately 1.5 inches in height, while second member 23 and fourth member 28 are approximately 1.5 inches in length. Also most preferably, the height of third member 26 is approximately 10 inches.

In another aspect, the present invention is embodied in a unique cross support, a preferred embodiment of which is shown in FIGS. 1, 2, and 4–6, and generally designated by reference numeral 70. Cross support 70 includes a first member 74 having a top 76, a bottom 77 and opposing sides 78 and 79. Extending from top 76 is an upper second member 80. A lower third member 84 extends from bottom 77 of first member 74. Preferably, second member 80 and third member 84 extend orthogonally from first member 74, in opposite directions. A first channel 82 is formed in side 78 of first member 74, proximate to second member 80. A second channel 85 is formed in side 79 of first member 74, proximate to third member 84. Preferably, cross support 70 is oriented with lower third member 84 extending rearwardly of first member 74. This positioning reduces the accumulation of road debris on third member 84.

The placement of channels 82 and 85 within first member 74 permits cross support 70 to be used in reversible manner. That is, cross support 70 may be positioned in I-beam 52 of first set of I-beams 50, with channel 82 receiving flange 55 of I-beam 52. Alternatively, cross support 70 may be positioned in, and extend from I-beam 62 with channel 85 receiving flange 65 of I-beam 62. Cross supports 70 are secured to I-beams 52 or 62 by welding channel 82 or 85 withing flange 55 or 65. Cross support 70 may be manufactured from many materials commonly used in the art including, but not limited to, metals, polymers, or metal alloys.

In the most preferred embodiment, the height of cross support 70 is approximately between 3.0 and 7.5 inches, whereas second member 80 and third member 84 extend approximately 1.5 inches from first member 74. Also in the most preferred embodiment, channels 82 and 85 have an approximate length of 1.375 inches and an approximate height of 0.25 inches. Additionally, the length of cross support 70 is most preferably between approximately 10.25 inches and 18.0 inches.

The reversibility of cross support 70 eliminates the need for the production of dedicated cross supports which extend toward a particular side of trailer 150. This in turn drastically reduces the production costs associated with the manufacturer of trailer 150.

It is to be understood that the foregoing is a description of the preferred embodiments. One skilled in the art will recognize that variations, modifications, and improvements may be made without departing from the spirit and scope of the invention disclosed herein. Scope of the protection is to be measured by the claims which follow and the breath of interpretation which the law allows.

The embodiments of the invention in which an exclusive property or privilege is claimed are defined as follows:

1. A sealing device for a trailer having an interior defined by a floor supported on a floor support assembly and an adjacently disposed sidewall extending above the floor, so as to define a slit therebetween, wherein the floor has bottom surface and the floor support assembly has a top surface, wherein the sidewall is attached to a plurality of sidewall support posts which extend below the floor and are coupled to the floor support assembly, said sealing device comprising:

an elongated member having a body adapted to be positioned and extend between the floor support assembly and the posts, a substantially planar flooring attachment zone adapted to be positioned between the floor and the floor support assembly, and a sidewall attachment zone configured to abut the sidewall, said planar flooring attachment zone having a top surface abutting the bottom of the floor and a bottom surface abutting the top of the floor support assembly, said planar flooring attachment zone having a substantially uniform cross section, said elongated member configured and adapted to form a barrier for preventing fluids and particulates from entering the interior of the trailer through the slit between the floor and sidewall.

2. The device as recited in claim 1, wherein said elongated member further comprises:

said body comprising a first generally vertical section;

said sidewall attachment zone comprising a first generally horizontal section attached to an end of said first generally vertical section, and a second generally vertical section attached to an end of said first generally horizontal section; and said flooring attachment zone comprising a second generally horizontal section attached to an end of said second generally vertical section.

3. The device as recited in claim 1, wherein said member is made of a metal alloy.

4. A support device for a trailer, wherein the trailer has a floor having a bottom surface, and a sidewall vertically positioned at an end of the floor, wherein the exterior surface of the sidewall is attached to the interior surface of a vertically oriented post, wherein the post extends below the floor, wherein the trailer has a beam positioned below the floor, and a cross support positioned between the beam and the post, wherein the cross support has a top surface, said device comprising:

an angled member positioned between the cross support and the post, said angled member having a horizontal section abutting the bottom surface of the floor, and the top surface of the cross support, said horizontal section having a substantially uniform cross section.

5. The device as recited in claim 4, wherein said angled member further comprises:

a first generally vertical section positioned between the panel and the post;

a first generally horizontal section positioned beneath the bottom of the post;

a second generally vertical section positioned between the post and the cross support; and a second generally horizontal section positioned between the cross support and the floor.

6. A seal for an enclosed trailer having a floor carried upon a floor support and a sidewall assembly wherein the floor has a bottom surface and the floor support has a top surface, said seal comprising:

an elongated rail having a central body with an upper end and a lower end;

a substantially planar upper flange projecting laterally from said central body upper end in a first direction and abutting the bottom surface of the floor and the top surface of the floor support, said planar upper flange having a substantially uniform cross section;

a lower flange projecting laterally from said central body lower end in a second direction opposite from said first direction and adapted to be coupled to said sidewall assembly, where in said seal impedes the passage of unwanted material between said sidewall assembly and said floor.

7. The seal as recited in claim 6, further comprising an outer flange projecting upwardly from said lower flange and spaced from said central body by said lower flange, said outer flange adapted to contact said sidewall assembly.

8. The seal as recited in claim 6, wherein said sidewall assembly includes a wall panel supported by vertical supports coupled to said floor support, said lower flange spacing said central body and said outer flange sufficiently to accommodate and seat said vertical supports therebetween.

* * * * *